US012322538B2

(12) United States Patent
Hamachi et al.

(10) Patent No.: US 12,322,538 B2
(45) Date of Patent: Jun. 3, 2025

(54) MULTILAYER INDUCTOR AND MOUNTING STRUCTURE OF MULTILAYER INDUCTOR

(71) Applicant: TDK CORPORATION, Tokyo (JP)

(72) Inventors: Noriaki Hamachi, Tokyo (JP); Toshinori Matsuura, Tokyo (JP); Junichiro Urabe, Tokyo (JP); Kazuya Tobita, Tokyo (JP); Yuto Shiga, Tokyo (JP); Youichi Kazuta, Tokyo (JP); Yuichi Takubo, Tokyo (JP)

(73) Assignee: TDK CORPORATION, Tokyo (JP)

( * ) Notice: Subject to any disclaimer, the term of this patent is extended or adjusted under 35 U.S.C. 154(b) by 721 days.

(21) Appl. No.: 17/568,754

(22) Filed: Jan. 5, 2022

(65) Prior Publication Data

US 2022/0216003 A1 Jul. 7, 2022

(30) Foreign Application Priority Data

Jan. 7, 2021 (JP) ................................ 2021-001494

(51) Int. Cl.

*H01F 27/29* (2006.01)
*H01F 27/06* (2006.01)
*H01F 27/28* (2006.01)
*H01F 41/04* (2006.01)

(52) U.S. Cl.

CPC ........... *H01F 27/292* (2013.01); *H01F 27/06* (2013.01); *H01F 27/2804* (2013.01); *H01F 41/041* (2013.01); *H01F 2027/2809* (2013.01)

(58) Field of Classification Search

CPC .... H01F 27/292; H01F 27/06; H01F 27/2804; H01F 2027/2809

USPC .................................................. 336/185, 200

See application file for complete search history.

(56) References Cited

U.S. PATENT DOCUMENTS

| | | | | |
|---|---|---|---|---|
| 10,115,515 | B2 * | 10/2018 | Ishikawa | H01F 27/292 |
| 2006/0006972 | A1 * | 1/2006 | Tozawa | H01F 27/292 336/200 |
| 2010/0253464 | A1 * | 10/2010 | Miyoshi | H01F 17/0013 336/200 |
| 2014/0070912 | A1 | 3/2014 | Moriyama | |
| 2015/0116056 | A1 * | 4/2015 | Masuda | H03H 7/1708 333/175 |
| 2017/0092413 | A1 * | 3/2017 | Matsunaga | H01F 27/2804 |
| 2017/0110777 | A1 * | 4/2017 | Baba | H05K 1/0243 |

(Continued)

FOREIGN PATENT DOCUMENTS

| | | | |
|---|---|---|---|
| CN | 103563022 | A | 2/2014 |
| JP | H10-144526 | A | 5/1998 |
| JP | 2006-086216 | A | 3/2006 |

(Continued)

*Primary Examiner* — Shawki S Ismail
(74) *Attorney, Agent, or Firm* — Oliff PLC

(57) ABSTRACT

A multilayer inductor includes: an element body formed by stacking a plurality of layers of insulators in a stacking direction; a terminal electrode provided on at least one side surface of the element body; and a linear conductor portion provided in the element body and extending in a first direction, wherein, as viewed from a second direction perpendicular to the first direction, the conductor portion has a first portion in a region overlapping the terminal electrode and a second portion in a region not overlapping the terminal electrode, and wherein a width of the first portion as viewed from the second direction is smaller than a width of the second portion.

4 Claims, 6 Drawing Sheets

(56) References Cited

U.S. PATENT DOCUMENTS

| | | | | |
|---|---|---|---|---|
| 2018/0090268 | A1* | 3/2018 | Noguchi | .................. H01G 4/30 |

FOREIGN PATENT DOCUMENTS

| | | | | | |
|---|---|---|---|---|---|
| JP | 2006-339617 | A | | 12/2006 | |
| JP | 2001196240 | A | * | 7/2019 | |
| WO | WO-2015064134 | A1 | * | 5/2015 | ............. H01F 17/00 |

* cited by examiner

MULTILAYER INDUCTOR AND MOUNTING STRUCTURE OF MULTILAYER INDUCTOR

CROSS REFERENCE TO RELATED APPLICATIONS

This application claims priority to Japanese Patent Application No. 2021-001494 filed on Jan. 7, 2021, the entire contents of which are incorporated by reference herein.

TECHNICAL FIELD

The present invention relates to a multilayer inductor and a mounting structure of a multilayer inductor.

BACKGROUND

In the related art, as a multilayer inductor, those described in Japanese Unexamined Patent Publication No. H10-144526 are known. This multilayer inductor includes an element body formed by stacking a plurality of layers made of an insulator in a stacking direction, terminal electrodes provided on the end surfaces and side surfaces of the element body, and a linear conductor portion provided in the element body and extending in a longitudinal direction of the element body. The conductor portion has a constant width over the entire longitudinal direction.

SUMMARY

Herein, in the multilayer inductor as described above, a wraparound portion is formed in which the terminal electrode wraps around from the end surface of the element body to the side surface. In this case, stray capacitance is generated between the wraparound portion of the terminal electrode and the linear conductor portion. In some case, due to the influence of such stray capacitance, the self-resonant frequency (SRF) of the multilayer inductor may be decreased.

An object of the present invention is to provide a multilayer inductor capable of improving a self-resonant frequency and a mounting structure of the multilayer inductor.

A multilayer inductor according to the present invention includes: an element body formed by stacking a plurality of layers of insulators in a stacking direction; a terminal electrode provided on at least one side surface of the element body; and a linear conductor portion provided in the element body and extending in a first direction, wherein, as viewed from a second direction perpendicular to the first direction, the conductor portion has a first portion in a region overlapping the terminal electrode and a second portion in a region not overlapping the terminal electrode, and wherein a width of the first portion as viewed from the second direction is smaller than a width of the second portion.

In the multilayer inductor according to the present invention, the linear conductor portion has a first portion in a region overlapping the terminal electrode as viewed from the second direction. The first portion is a portion where stray capacitance is likely to be generated with the terminal electrode on the side surface. Herein, the width of the first portion as viewed from the second direction is smaller than the width of the second portion of the region not overlapping the terminal electrode. Accordingly, the stray capacitance between the first portion and the terminal electrode on the side surface can be reduced. From the above, the self-resonant frequency of the multilayer inductor can be improved.

A width of the first portion as viewed from a third direction perpendicular to the first direction and the second direction may be smaller than the width of the second portion. In this case, the width of the second portion as viewed from the third direction can be relatively increased. Accordingly, the cross-sectional area of the second portion not overlapping the terminal electrode on the side surface can be increased, so that DC resistance (Rdc) of the conductor portion can be reduced.

As viewed from the first direction, the conductor portion has a shape spreading in a third direction perpendicular to the first direction and the second direction, and a mark for identifying the posture of the conductor portion may be formed in the element body. In this case, when the multilayer inductor is mounted on a mounting board, the posture of the conductor portion spreading in the third direction can be set to a desired state by checking the mark.

A mounting structure of a multilayer inductor according to the present invention includes the above-mentioned multilayer inductor and a mounting board on which the multilayer inductor is mounted via the terminal electrode, wherein the multilayer inductor is mounted so that the conductor portion rises from a mounting surface of the mounting board as viewed from the first direction.

In the mounting structure of the multilayer inductor according to the present invention, since the multilayer inductor is mounted so that the conductor portion rises from the mounting surface of the mounting board, it is possible to reduce the stray capacitance generated between the conductor portion and the mounting board. Accordingly, the self-resonant frequency of the multilayer inductor can be improved.

According to the present invention, it is possible to provide a multilayer inductor capable of improving a self-resonant frequency and a mounting structure of the multilayer inductor.

DETAILED DESCRIPTION

First Embodiment

Figure 1:
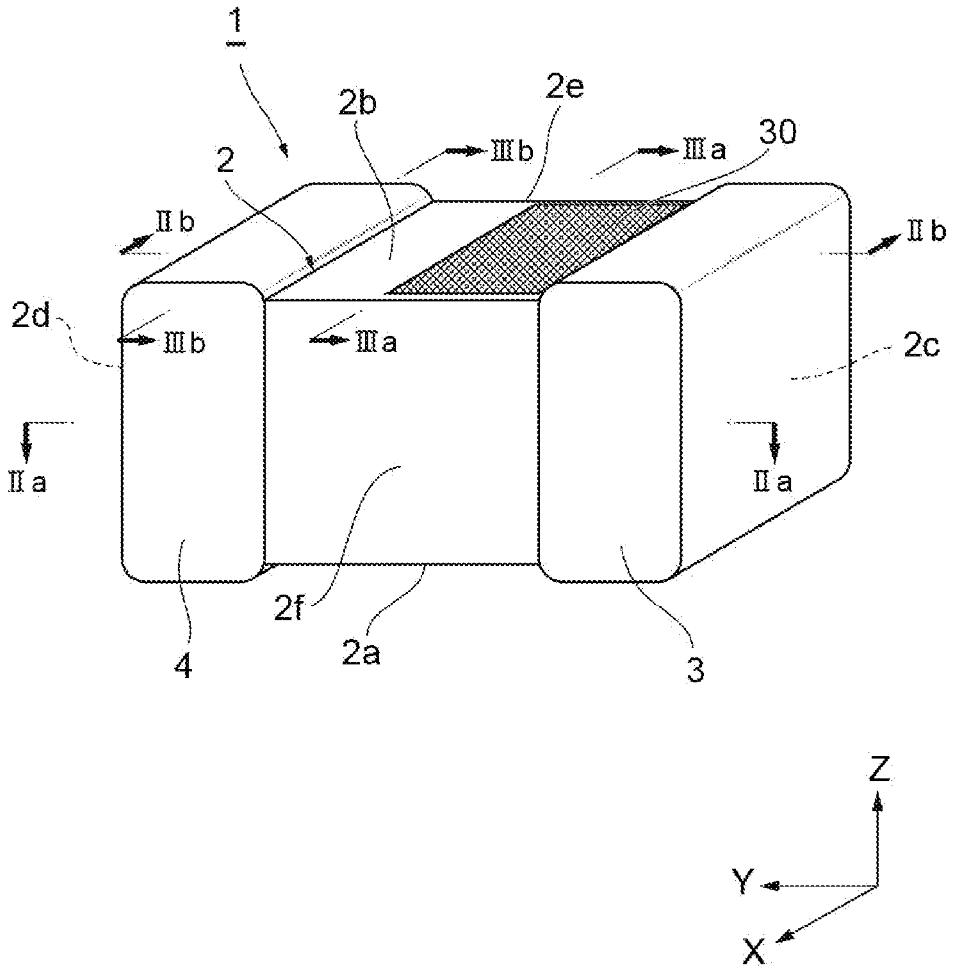
FIG. 1 is a perspective view illustrating a multilayer inductor according to a first embodiment of the present invention.
Figure 2B:
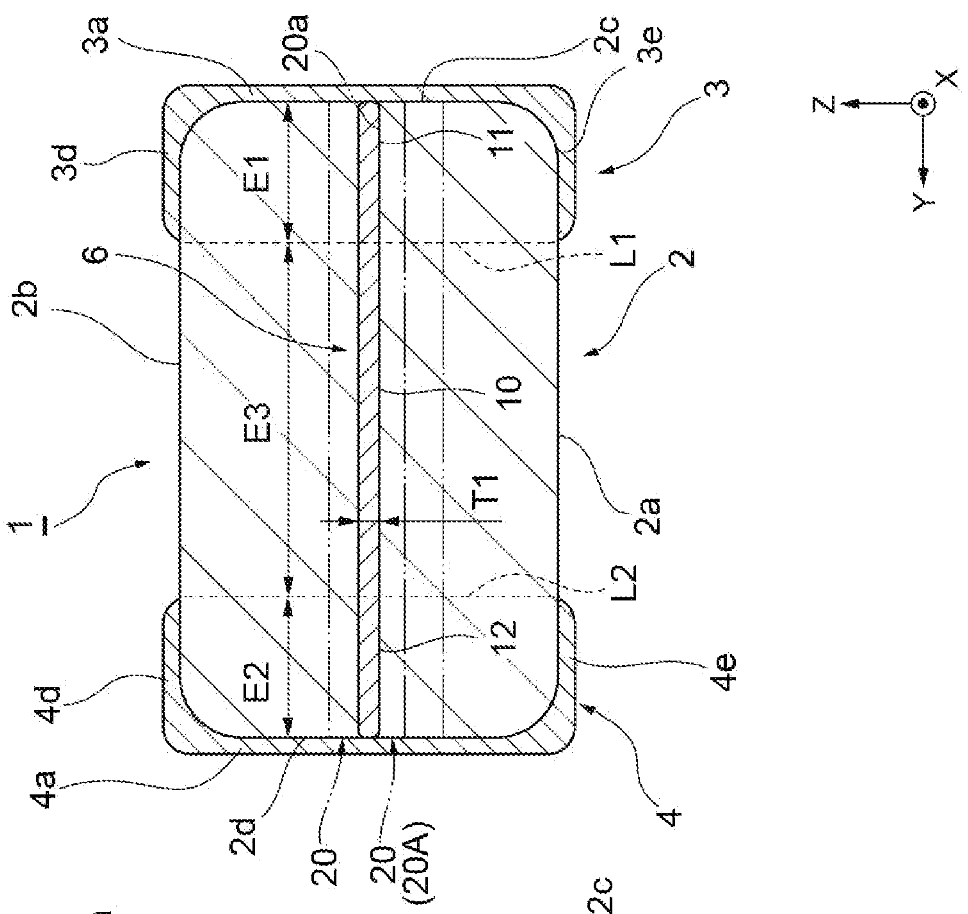
FIG. 2B is a cross-sectional view taken along line IIb-IIb illustrated in FIG. 1.
Figure 2A:
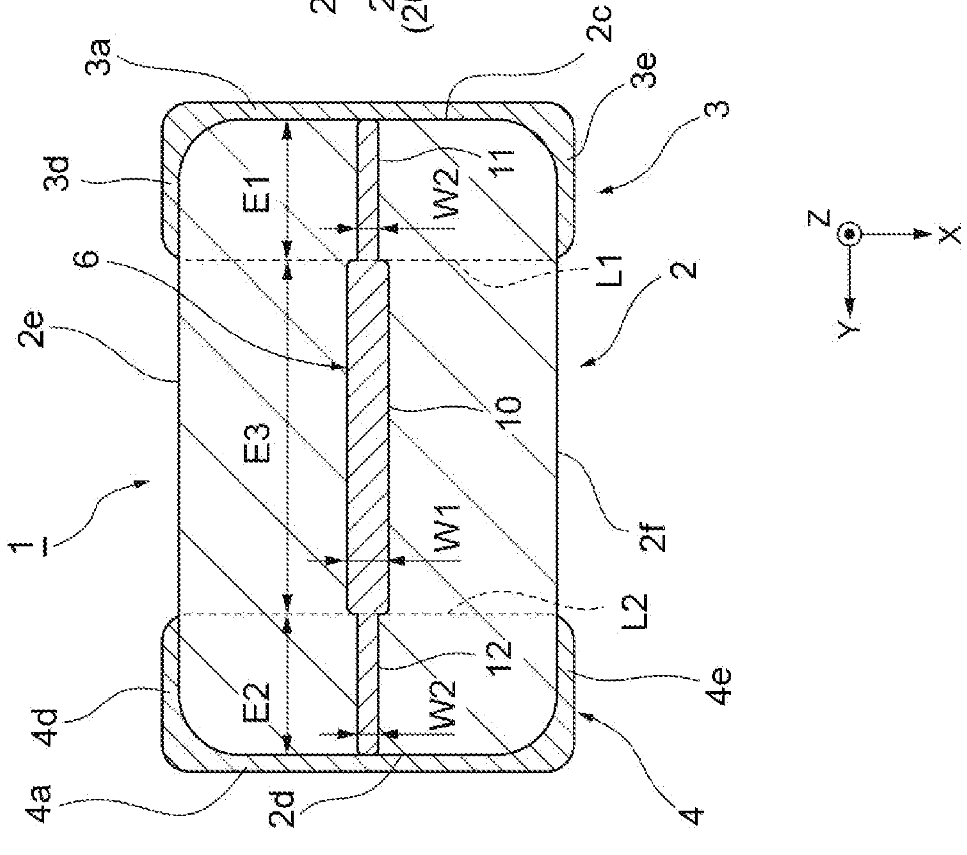
FIG. 2A is a cross-sectional view taken along line IIa-IIa illustrated in FIG. 1.
Figure 3B:
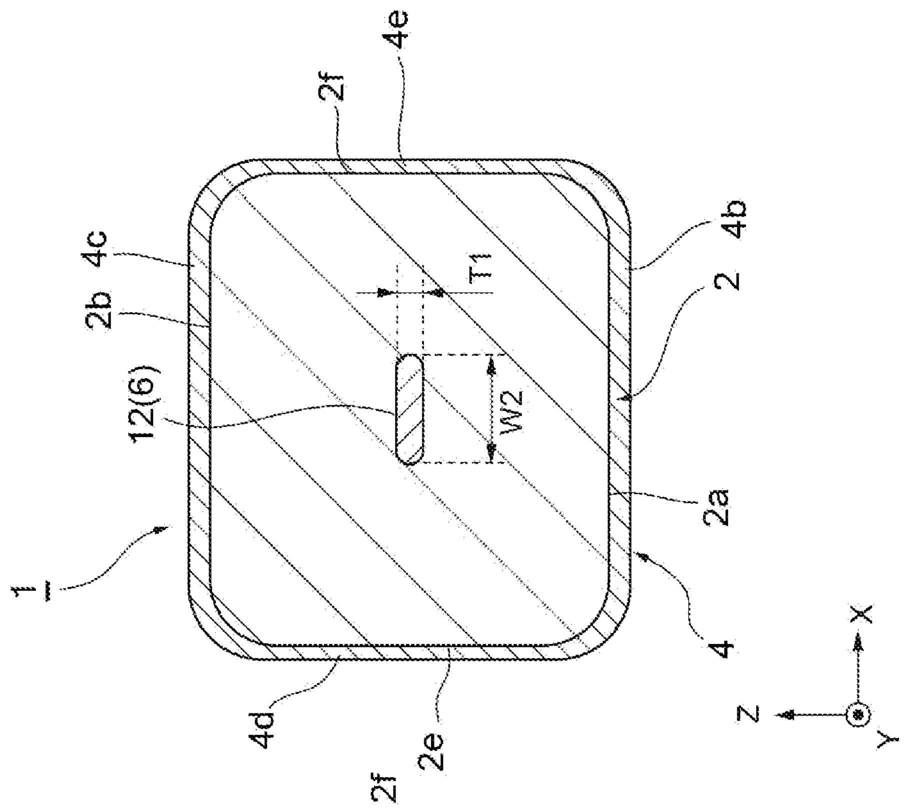
FIG. 3B is a cross-sectional view taken along line IIIb-IIIb illustrated in FIG. 1.
Figure 3A:
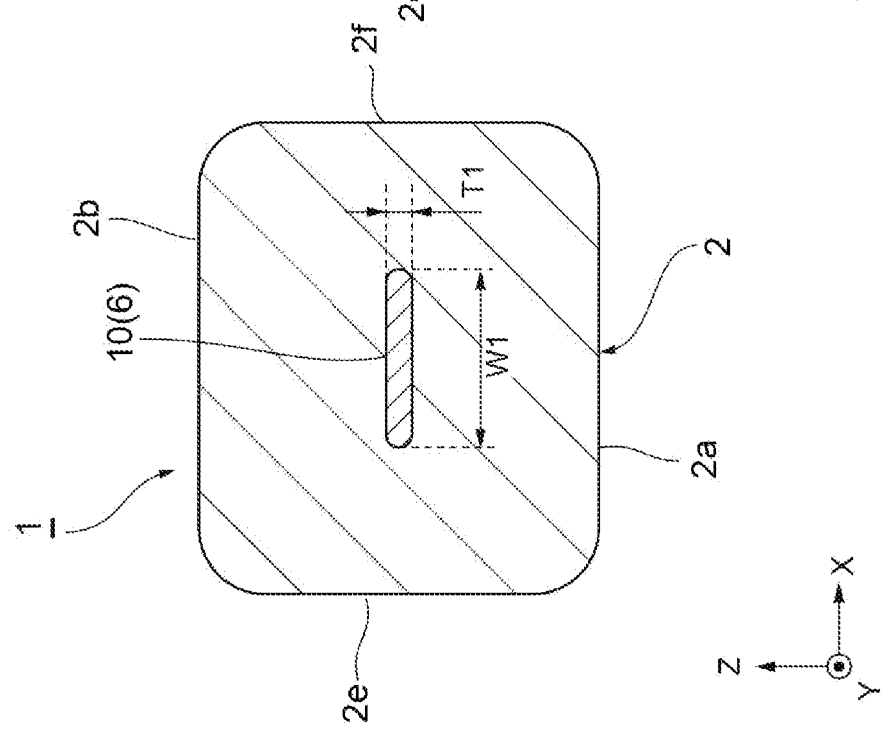
FIG. 3A is a cross-sectional view taken along line IIIa-IIIa illustrated in FIG. 1.

A multilayer inductor according to a first embodiment of the present invention will be described with reference to FIGS. 1 to 3A and 3B. FIG. 1 is a perspective view illustrating a multilayer inductor 1 according to the first embodiment of the present invention. FIG. 2A is a cross-sectional view taken along line IIa-IIa illustrated in FIG. 1. FIG. 2B is a cross-sectional view taken along line IIb-IIb illustrated in FIG. 1. FIG. 3A is a cross-sectional view taken along line IIIa-IIIa illustrated in FIG. 1. FIG. 3B is a cross-sectional view taken along line IIIb-IIIb illustrated in FIG. 1.

As illustrated in FIG. 1, the multilayer inductor 1 includes an element body 2 and terminal electrodes 3 and 4. The element body 2 is a member formed by stacking a plurality of layers made of an insulator in a stacking direction. The element body 2 has a rectangular parallelepiped shape. It is noted that, in the following description, in some cases, XYZ coordinates may be set for the multilayer inductor 1 for description. Herein, a Z-axis direction is set to the "stacking direction Z" in which a plurality of layers are stacked. Further, among directions perpendicular to the stacking direction Z, a Y-axis direction is set to a "longitudinal direction Y" of the element body 2, and an X-axis direction is set to a "lateral direction X" of the element body 2. Of the stacking directions Z, an upper side is set as a positive side, and a lower side is set as a negative side. One side of the lateral direction X and the longitudinal direction Y is set to the positive side. It is noted that the XYZ coordinates are relative coordinates set for the multilayer inductor 1.

The element body 2 has side surfaces 2*a* and 2*b* facing in the stacking direction Z, end surfaces 2*c* and 2*d* facing in the longitudinal direction Y, and side surfaces 2*e* and 2*f* facing in the lateral direction X. The side surface 2*a* is disposed on the negative side in the stacking direction Z, and the side surface 2*b* is disposed on the positive side in the stacking direction Z. The end surface 2*c* is disposed on the negative side in the longitudinal direction Y, and the end surface 2*d* is disposed on the positive side in the longitudinal direction Y. The side surface 2*e* is disposed on the negative side in the lateral direction X, and the side surface 2*f* is disposed on the positive side in the lateral direction X. It is noted that the material of the element body 2 is not particularly limited, and an optimum material may be adopted depending on the application of the multilayer inductor 1, but for example, glass, ceramic or the like may be adopted. Although not particularly limited, the dimension of the element body 2 in the longitudinal direction Y is set to 0.3 to 1.6 mm, the dimension in the lateral direction X is set to 0.3 to 1.6 mm, and the dimension in the stacking direction Z is set to 0.3 to 1 mm.

The terminal electrodes 3 and 4 are electrodes formed in the vicinity of the end surfaces 2*c* and 2*d* of the element body 2. The terminal electrodes 3 and 4 are adhered to terminals of a mounting board when the multilayer inductor 1 is mounted. The terminal electrode 3 is provided so as to cover the entire surface of the end surface 2*c* and to cover the regions of the side surfaces 2*a*, 2*b*, 2*e*, and 2*f* in the vicinity of the end surface 2*c*. The terminal electrode 3 is formed so as to wrap around from the end surface 2*c* to the side surfaces 2*a*, 2*b*, 2*e*, and 2*f*. The terminal electrode 4 is provided so as to cover the entire surface of the end surface 2*d* and to cover the regions of the side surfaces 2*a*, 2*b*, 2*e*, and 2*f* in the vicinity of the end surface 2*d*. The terminal electrode 4 is formed so as to wrap around from the end surface 2*d* to the side surfaces 2*a*, 2*b*, 2*e*, and 2*f*. The terminal electrodes 3 and 4 are disposed so as to be separated from each other in the longitudinal direction Y. Accordingly, the regions of the side surfaces 2*a*, 2*b*, 2*e*, and 2*f* in the vicinity of the center in the longitudinal direction Y are in a state exposed from the terminal electrodes 3 and 4. The materials of the terminal electrodes 3 and 4 are not particularly limited, and an optimum material may be adopted depending on the application of the multilayer inductor 1, but for example, silver, copper, or the like may be adopted. The terminal electrodes 3 and 4 may be formed by a dip method in which the end portion of the element body 2 is immersed in a paste of the electrode. However, the method for forming the terminal electrodes 3 and 4 is not particularly limited, and the terminal electrodes 3 and 4 may be formed by another method such as printing an electrode paste on the end portion of the element body 2.

Next, the internal structure of the element body 2 will be described with reference to FIGS. 2A,2B,3A and 3B. As illustrated in FIGS. 2A,2B,3A and 3B, the multilayer inductor 1 includes a conductor portion 6 provided in the element body 2. As illustrated in FIGS. 2A and 2B, the conductor portion 6 is a linear conductor pattern provided in the element body 2 and extending in the longitudinal direction Y. The conductor portion 6 is disposed at the center position in the stacking direction Z and at the center position in the lateral direction X in the inside of the element body 2. The conductor portion 6 has a band-like shape that spreads parallel to the XY plane and extends in the Y-axis direction. Accordingly, the conductor portion 6 has a shape spreading in the lateral direction X as viewed from the longitudinal direction Y (refer to FIGS. 3A and 3B).

The negative end of the conductor portion 6 in the longitudinal direction Y is exposed to the end surface 2*c* of the element body 2. Accordingly, the conductor portion 6 is electrically connected to a main body portion 3*a* of the terminal electrode 3 that covers the end surface 2*c*. The positive end of the conductor portion 6 in the longitudinal direction Y is exposed to the end surface 2*d* of the element body 2. Accordingly, the conductor portion 6 is electrically connected to a main body portion 4*a* of the terminal electrode 4 that covers the end surface 2*d*. It is noted that, in the present embodiment, since the conductor portion 6 extends in the longitudinal direction Y, the longitudinal direction Y corresponds to the "first direction" in the claims. Further, the stacking direction Z corresponds to the "second direction" in the claims. Further, the lateral direction X corresponds to the "third direction" in the claims.

Herein, the element body 2 is formed by stacking a plurality of layers 20 in the stacking direction Z (refer to FIG. 2B). The layer 20 is configured as a single sheet body before sintering, and after sintering, the boundary portion between the layers 20 is integrated in an invisible manner. In FIG. 2B, for the convenience of description, a portion of the layer 20 is illustrated by a virtual line. Of the plurality of layers 20, a conductor pattern of the conductor portion 6 is formed on one main surface 20*a* of one layer 20A. No conductor pattern is formed on the other layers 20. The conductor portion 6 is formed at the center position in the stacking direction Z by stacking and sintering the plurality of layers 20.

Next, a shape of the conductor portion 6 based on a positional relationship with the terminal electrodes 3 and 4 will be described. As illustrated in FIGS. 2A and 2B, in the longitudinal direction Y, the element body 2 has a region E1 covered with the terminal electrode 3, a region E2 covered with the terminal electrode 4, and a region E3 not covered with any of the terminal electrodes 3 and 4. As illustrated in FIG. 2B, the region E1 is a region interposed in the stacking direction Z by wraparound portions 3*b* and 3*c* of the terminal electrode 3 covering the side surfaces 2*a* and 2*b*. The region E2 is a region interposed in the stacking direction Z by wraparound portions 4*b* and 4*c* of the terminal electrode 4 covering the side surfaces 2*a* and 2*b*. The region E3 is a region where the side surfaces 2*a* and 2*b* are exposed from the wraparound portions 3*b* and 3*c* of the terminal electrode 3 and the wraparound portions 4*b* and 4*c* of the terminal electrode 4. As illustrated in FIG. 2A, the region E1 is a region interposed in the lateral direction X by wraparound portions 3*d* and 3*e* of the terminal electrodes 3 covering the side surfaces 2*e* and 2*f*. The region E2 is a region interposed in the lateral direction X by wraparound portions 4*d* and 4*e* of the terminal electrodes 4 covering the side surfaces 2*e* and 2*f*. The region E3 is a region where the side surfaces 2*e* and 2*f* are exposed from the wraparound portions 3*d* and 3*e* of the terminal electrode 3 and the wraparound portions 4*d* and 4*e* of the terminal electrode 4. It is noted that, in the present embodiment, since the wraparound amounts of the wraparound portions 3*b*, 3*c*, 3*d*, and 3*e* are the same, a boundary L1 between the region E1 and the region E3 is defined by the positions of the positive ends of the wraparound portions 3*b*, 3*c*, 3*d*, and 3*e* in the longitudinal direction Y. However, when the wraparound amounts of the wraparound portions 3*b*, 3*c*, 3*d*, and 3*e* are different from each other, the boundary L1 is defined by the end portion of the wraparound portion having the largest wraparound amount. The same applies to a boundary L2 between the region E2 and the region E3.

As viewed from the stacking direction Z, the conductor portion 6 overlaps the terminal electrodes 3 and 4 in the regions E1 and E2 and does not overlap the terminal electrodes 3 and 4 in the region E3. In contrast, as viewed from the stacking direction Z, the conductor portion 6 has first portions 11 and 12 in the regions E1 and E2 overlapping the terminal electrodes 3 and 4 in the regions E1 and E2 and a second portion 10 in the region E3 not overlapping the terminal electrodes 3 and 4. In the present embodiment, the boundary between the first portion 11 and the second portion 10 coincides with the boundary L1 between the region E1 and the region E3. Further, the boundary between the first portion 12 and the second portion 10 coincides with the boundary L2 between the region E2 and the region E3. However, a portion of the first portions 11 and 12 may extend to the regions E3, and the second portion 10 may extend to the regions E1 and E2.

As illustrated in FIG. 2A, the width of the first portions 11 and 12 as viewed from the stacking direction Z is smaller than the width of the second portion 10. As illustrated in FIGS. 2A and 3A, the width dimension of the second portion 10 is set to a "dimension W1". Further, as illustrated in FIGS. 2A and 3B, the width dimension of the first portions 11 and 12 is set to a "dimension W2". In this case, the relationship of "dimension W1>dimension W2" is established. It is noted that, although not particularly limited, the dimension W1 of the second portion 10 may be set to 60 to 150 μm. On the other hand, the dimension W2 of the first portions 11 and 12 may be set to 50 to 90% of the dimension W1. It is noted that, in the present embodiment, the widths (that is, thicknesses) of the first portions 11 and 12 and the second portion 10 as viewed from the lateral direction X are constant as a "dimension T1". Although not particularly limited, the dimension T1 is set to 5 to 40 μm.

It is noted that, as illustrated in FIGS. 3A and 3B, the conductor portion 6 has a shape spreading in the lateral direction X as viewed from the longitudinal direction Y, and the dimensions W1 and W2 are larger than the dimensions T1. As described above, at the time of mounting, the posture of the conductor portion 6 changes depending on which side surface of the side surfaces 2*a*, 2*b*, 2*e*, and 2*f* is mounted on the mounting board. Therefore, as illustrated in FIG. 1, a mark 30 for identifying the posture of the conductor portion 6 is formed on the element body 2. In the present embodiment, the mark 30 is formed on the side surface 2*b*. However, the position in the multilayer inductor 1 where the mark 30 is formed and the shape in which the mark 30 is formed are not particularly limited.

Next, the function and effect of the multilayer inductor 1 according to the present embodiment will be described.

In the multilayer inductor 1 according to the present embodiment, the linear conductor portion 6 has the first portions 11 and 12 in the regions E1 and E2 overlapping the terminal electrodes 3 and 4 as viewed from the stacking direction Z. The first portion 11 is a portion where stray capacitance is likely to be generated between the side surfaces 2*a* and 2*b* and the wraparound portions 3*b* and 3*c* of the terminal electrode 3. The first portion 12 is a portion where the stray capacitance is likely to be generated between the side surfaces 2*a* and 2*b* and the wraparound portions 4*b* and 4*c* of the terminal electrode 4. Herein, the width of the first portions 11 and 12 as viewed from the stacking direction Z is smaller than the width of the second portion 10 of the region E3 not overlapping the terminal electrodes 3 and 4. Accordingly, the stray capacitance between the first portions 11 and 12 and the side terminal electrodes 3 and 4 can be reduced. From the above, the self-resonant frequency of the multilayer inductor 1 can be improved.

It is noted that the structures of the first portions 11 and 12 and the second portion 10 of the conductor portion 6 may be realized by decreasing the width of the portion corresponding to the first portions 11 and 12 in the conductor portion (conductor pattern having a constant width over the entire region in the longitudinal direction Y) in the related art, may be realized by increasing the width of the portion corresponding to the second portion 10, or may be realized by both methods. When the width of the portion corresponding to the first portions 11 and 12 is decreased, the stray capacitance with the terminal electrodes 3 and 4 can be reduced as compared with the conductor portion in the related art. When the width of the portion corresponding to the second portion 10 is increased, DC resistance of the conductor portion 6 can be reduced. When trying to obtain the same DC resistance with the conductor portion in the related art, since the width of the entire conductor portion is increased, as a result, the stray capacitance with the terminal electrodes 3 and 4 is increased. When the width of the portion corresponding to the second portion 10 is increased, the DC resistance can be reduced while suppressing such an increase in stray capacitance. That is, with respect to the obtained DC resistance, the self-resonant frequency of the multilayer inductor 1 can be relatively improved as compared with that in the related art.

As viewed from the longitudinal direction Y, the conductor portion 6 has a shape spreading in the lateral direction X perpendicular to the longitudinal direction Y and the stacking direction Z, and the mark 30 for identifying the posture of the conductor portion 6 may be formed on the element body 2. In this case, when the multilayer inductor 1 is mounted on the mounting board, the posture of the conductor portion 6 spreading in the lateral direction X can be set to a desired state by checking the mark 30.

Second Embodiment

Figure 4B:
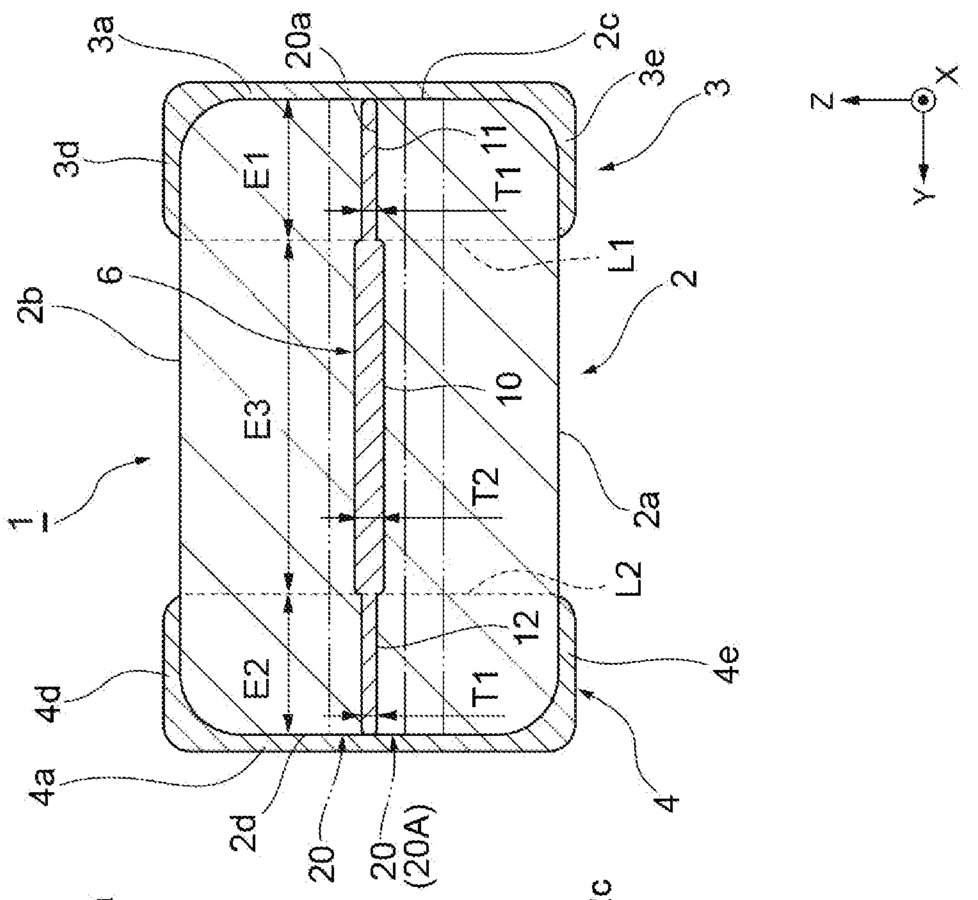
FIG. 4B is a cross-sectional view corresponding to FIG. 2B illustrating the multilayer inductor according to the second embodiment.
Figure 4A:
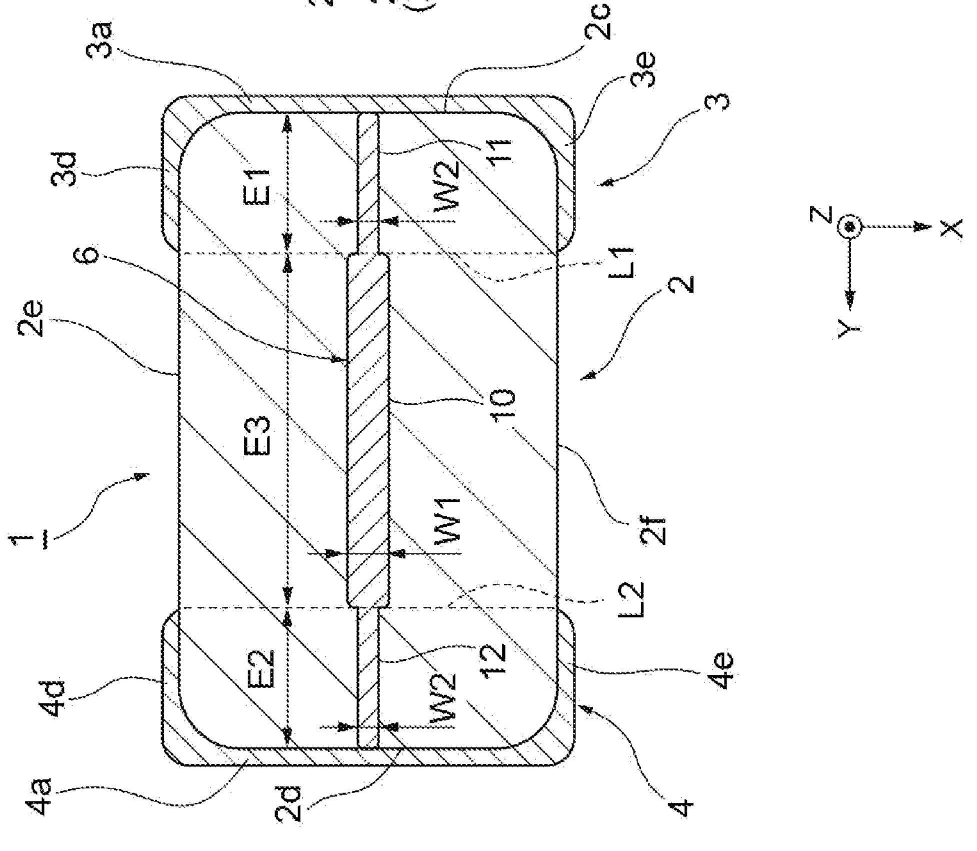
FIG. 4A is a cross-sectional view corresponding to FIG. 2A illustrating a multilayer inductor according to a second embodiment.
Figure 5B:
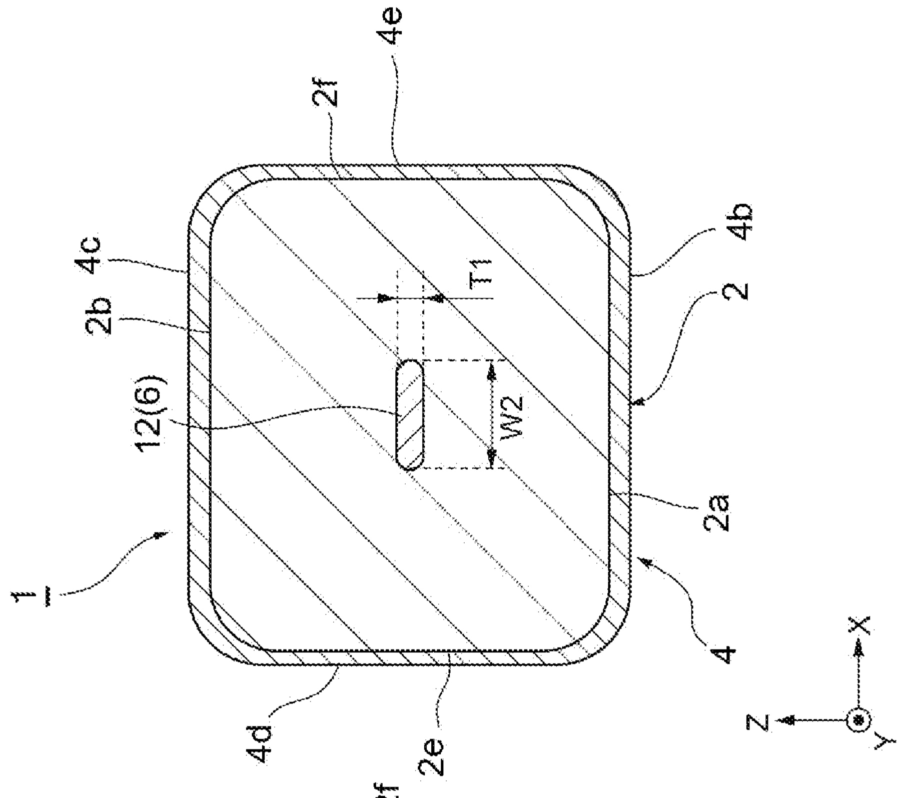
FIG. 5B is a cross-sectional view corresponding to FIG. 3B illustrating the multilayer inductor according to the second embodiment.
Figure 5A:
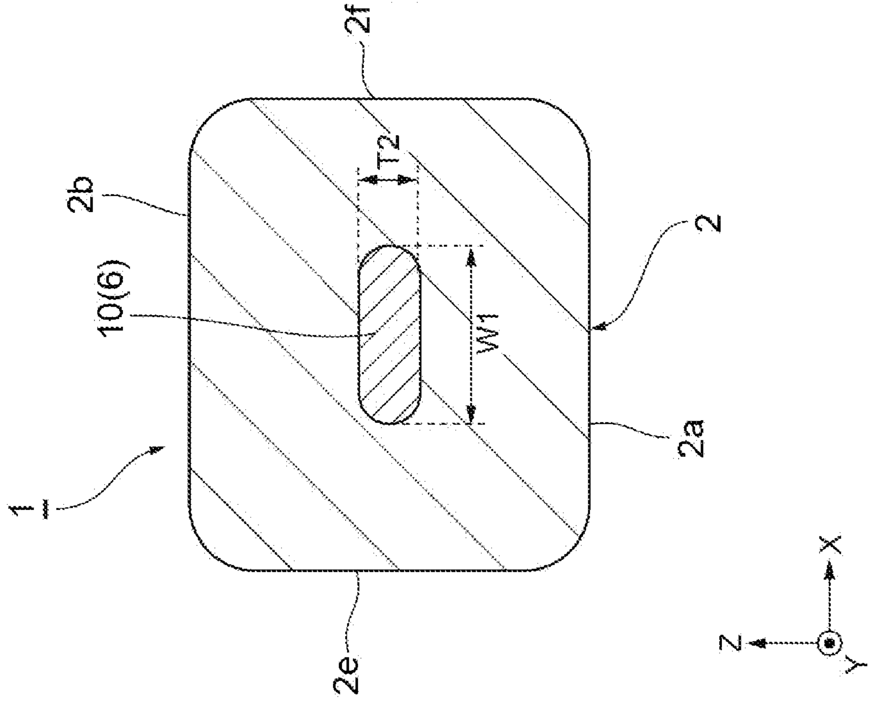
FIG. 5A is a cross-sectional view corresponding to FIG. 3A illustrating the multilayer inductor according to the second embodiment.

Next, a multilayer inductor 1 according to a second embodiment will be described with reference to FIGS. 4A,4B,5A and 5B. FIG. 4A is a cross-sectional view corresponding to FIG. 2A illustrating the multilayer inductor 1 according to the second embodiment. FIG. 4B is a cross-sectional view corresponding to FIG. 2B illustrating the multilayer inductor 1 according to the second embodiment. FIG. 5A is a cross-sectional view corresponding to FIG. 3A illustrating the multilayer inductor 1 according to the second embodiment. FIG. 5B is a cross-sectional view corresponding to FIG. 3B illustrating the multilayer inductor 1 according to the second embodiment.

In the multilayer inductor 1 according to the second embodiment, as illustrated in FIG. 4B, the width (that is, the thickness) of the first portions 11 and 12 as viewed from the lateral direction X is smaller than the width (that is, the thickness) of the second portion 10. As illustrated in FIGS. 4B and 5B, the width dimension of the first portions 11 and 12 as viewed from the lateral direction X is set to a "dimension T1" similarly to the first embodiment. In contrast, as illustrated in FIGS. 4B and 5A, the width dimension of the second portion 10 as viewed from the lateral direction X is set to a "dimension T2". In this case, the relationship of "dimension T2>dimension T1" is established. It is noted that, although not particularly limited, the dimension T2 of the second portion 10 may be set to 50 to 90% of the dimension T1. The other components of the second embodiment are the same as those of the first embodiment.

The dimensional relationship as described above can be realized by increasing the thickness of the conductor pattern of the second portion 10 as compared with the first embodiment. For example, when printing a conductor paste on a sheet body of the layer 20A before sintering, only the portion corresponding to the second portion 10 may be printed a plurality of times. Accordingly, as illustrated in FIG. 4B, the thickness of the second portion 10 can be increased to the positive side in the stacking direction Z. Further, in the main surface 20*a* of the layer 20A, a groove is provided at the portion corresponding to the second portion 10, and the groove is filled with a conductive paste to thicken the second portion 10 by the depth of the groove. Accordingly, as illustrated in FIG. 4B, the thickness of the second portion 10 can be increased to the negative side in the stacking direction Z. It is noted that the method of increasing the thickness of the second portion 10 is not particularly limited. The thickness of the second portion 10 may be increased only on either the positive side or the negative side of the stacking direction Z.

In the multilayer inductor 1 according to the second embodiment, the width of the second portion 10 as viewed from the lateral direction X can be relatively increased. Accordingly, the cross-sectional area of the second portion not overlapping the terminal electrode on the side surface can be increased, so that the DC resistance (Rdc) of the conductor portion can be reduced.

Figure 6B:
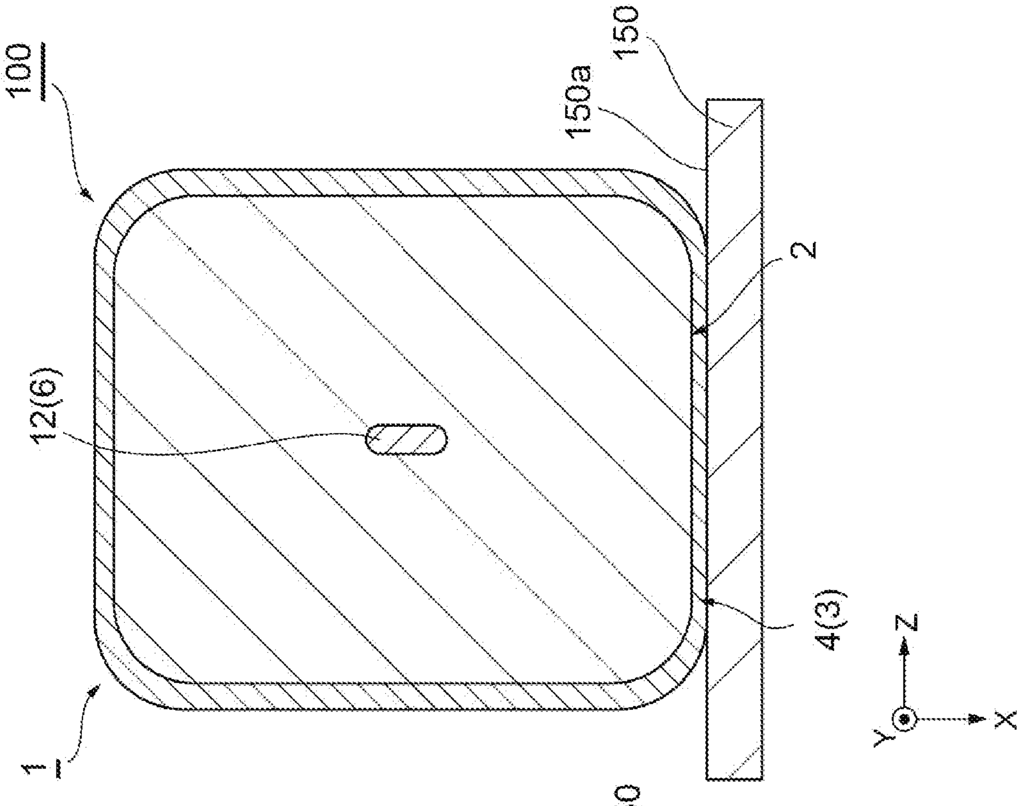
FIG. 6B is a cross-sectional view corresponding to FIG. 3B illustrating the mounting structure in which the multilayer inductor according to the second embodiment is mounted on the mounting board.
Figure 6A:
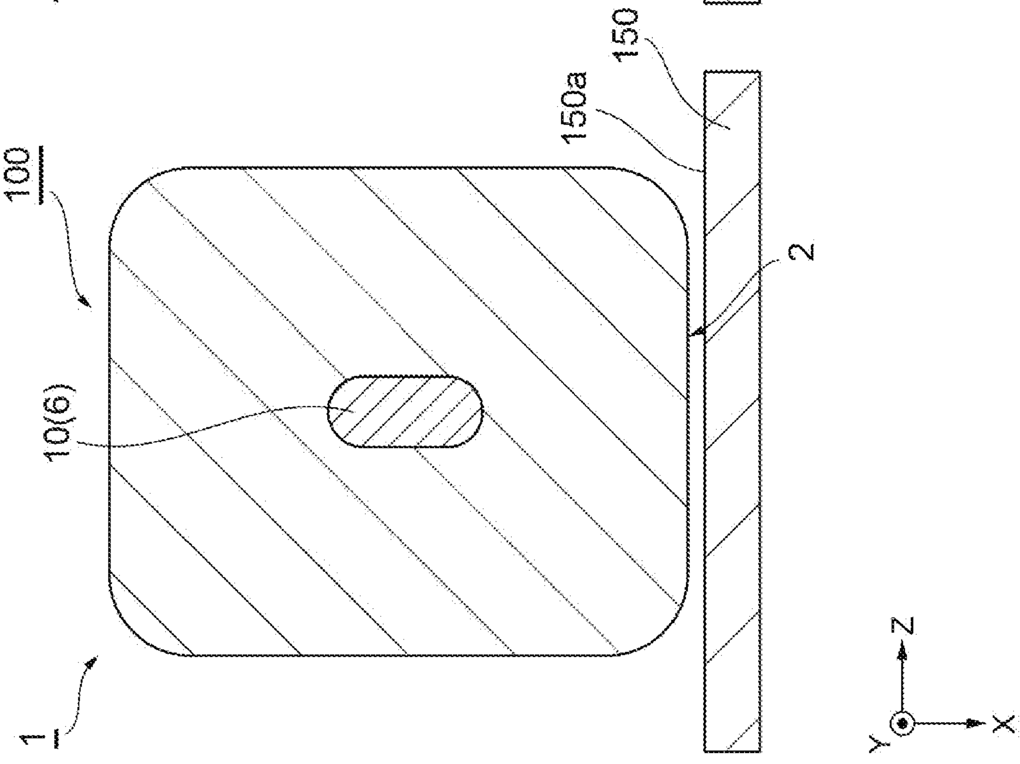
FIG. 6A is a cross-sectional view corresponding to FIG. 3A illustrating a mounting structure in which the multilayer inductor according to the second embodiment is mounted on a mounting board.

When the multilayer inductor 1 according to each embodiment is mounted on the mounting board, even though the mounting is performed in a state where the lateral direction X (that is, the direction in which the conductor portion 6 spreads) and a mounting surface of the mounting board are parallel to each other, a sufficient effect can be obtained. However, by adopting a mounting structure as illustrated in FIGS. 6A and 6B, the self-resonant frequency of the multilayer inductor 1 can be further reduced. FIG. 6A is a cross-sectional view corresponding to FIG. 3A illustrating a mounting structure 100 in which the multilayer inductor 1 according to the second embodiment is mounted on a mounting board 150, and FIG. 6B is a cross-sectional view corresponding to FIG. 3B illustrating the mounting structure 100 in which the multilayer inductor 1 according to the second embodiment is mounted on the mounting board 150.

Specifically, as illustrated in FIGS. 6A and 6B, the mounting structure 100 of the multilayer inductor 1 includes the multilayer inductor 1 described above and the mounting board 150 on which the multilayer inductor 1 is mounted via the terminal electrodes 3 and 4. The multilayer inductor 1 is mounted so that the conductor portion 6 rises from a mounting surface 150*a* of the mounting board 150 as viewed from the longitudinal direction Y.

In the mounting structure 100 of the multilayer inductor 1, since the multilayer inductor 1 is mounted so that the conductor portion 6 rises from the mounting surface 150*a* of the mounting board 150, the stray capacitance generated between the conductor portion 6 and the mounting board 150 can be reduced. Accordingly, the self-resonant frequency of the multilayer inductor 1 can be improved.

It is noted that, when the multilayer inductor 1 is mounted so as to have such a positional relationship, it is effective to grasp the posture of the conductor portion 6 inside the element body 2 by referring to the mark 30 (refer to FIG. 1).

The present invention is not limited to the above-described embodiments.

For example, the shape of the element body 2 and the shapes of the terminal electrodes 3 and 4 may be changed as appropriate. Along with this, the shapes and ratios of the first portions 11 and 12 and the second portion 10 are also appropriately changed.

In the above-described embodiment, the terminal electrodes 3 and 4 have main body portions 3*a* and 4*a* and four wraparound portions, respectively. However, the terminal electrodes 3 and 4 may be provided on at least one side surface of the four side surfaces 2*a*, 2*b*, 2*e*, and 2*f*, and the portions corresponding to the other side surface and the end surface may be omitted. It is noted that, when the terminal electrodes 3 and 4 are provided only on the side surface, the conductor portion 6 and the terminal electrodes 3 and 4 may be connected via through-hole conductor or the like.

REFERENCE SIGNS LIST

1: multilayer inductor, 2: element body, 2*a*, 2*b*, 2*e*, 2*f*: side surface, 3, 4: terminal electrode, 6: conductor portion, 10: second portion, 11, 12: first portion, 30: mark, 100: mounting structure, 150: mounting board.

What is claimed is:

1. A multilayer inductor comprising:

an element body formed by stacking a plurality of layers of insulators in a stacking direction, the element body having a first side surface, a second side surface, a first end surface and a second end surface, the first end surface and the second end surface facing each other in a first direction and each connecting the first side surface and the second side surface, the first side surface and the second side surface opposing each other in a second direction perpendicular to the first direction;

a first terminal electrode provided on the first end surface and extending on the first side surface;

a second terminal electrode provided on the second end surface and extending on the first side surface; and a linear conductor portion provided in the element body and extending in the first direction, the linear conductor portion having a first end connecting the first terminal electrode at the first end surface and a second end connecting the second terminal electrode at the second end surface, wherein, as viewed from the second direction, the conductor portion has a first portion in a region overlapping the terminal electrode and a second portion in a region not overlapping the terminal electrode, and wherein a width of the first portion as viewed from the second direction is smaller than a width of the second portion.

2. The multilayer inductor according to claim 1, wherein a width of the first portion as viewed from a third direction perpendicular to the first direction and the second direction is smaller than the width of the second portion.

3. The multilayer inductor according to claim 1, wherein, as viewed from the first direction, the conductor portion has a shape spreading in a third direction perpendicular to the first direction and the second direction, and wherein a mark for identifying a posture of the conductor portion is formed in the element body.

4. A mounting structure of a multilayer inductor, comprising:

the multilayer inductor according to claim 1; and a mounting board on which the multilayer inductor is mounted via the terminal electrodes, wherein the multilayer inductor is mounted so that the conductor portion rises from a mounting surface of the mounting board as viewed from the first direction.

* * * * *